United States Patent [19]

Kaneko et al.

[11] Patent Number: 4,912,928
[45] Date of Patent: Apr. 3, 1990

[54] EXHAUST HEAT EXCHANGER SYSTEM

[75] Inventors: Shozo Kaneko; Susumu Sato; Tadashi Gengo; Jiro Takada; Joji Ichinari; Misao Yamamura; Shuya Nagayama, all of Nagasaki, Japan

[73] Assignee: Mitsubishi Jukogyo Kabushiki Kaisha, Tokyo, Japan

[21] Appl. No.: 221,418

[22] Filed: Jul. 19, 1988

[30] Foreign Application Priority Data

Sep. 11, 1987 [JP] Japan .................... 62-226605

[51] Int. Cl.⁴ .............................................. F01N 3/28
[52] U.S. Cl. ........................................ 60/298; 60/320; 165/159; 422/173; 422/175
[58] Field of Search .................. 60/298, 320; 165/159; 422/173, 175

[56] References Cited

U.S. PATENT DOCUMENTS

| 1,840,836 | 1/1932 | Davis ................... 165/159 |
| 4,190,629 | 2/1980 | Strachan ............... 60/298 |
| 4,572,110 | 2/1986 | Haeflich . |
| 4,602,673 | 7/1986 | Michelfelder et al. . |
| 4,739,826 | 4/1988 | Michelfelder et al. . |

FOREIGN PATENT DOCUMENTS

| 190366 | 8/1986 | European Pat. Off. . |
| 2129210 | 12/1972 | Fed. Rep. of Germany . |
| 2360255 | 6/1976 | Fed. Rep. of Germany . |
| 2325812 | 4/1977 | France . |
| 2360045 | 2/1978 | France . |
| 2539216 | 7/1984 | France . |
| 20659 | 6/1972 | Japan ................... 60/298 |
| 52-41701 | 10/1977 | Japan . |
| 53-64103 | 6/1978 | Japan . |
| 345 | 1/1982 | Japan ................... 60/298 |
| 57-196013 | 12/1982 | Japan . |
| 59-7822 | 2/1984 | Japan . |
| 60-93110 | 5/1985 | Japan . |
| 60-216060 | 10/1985 | Japan . |
| 61-85542 | 5/1986 | Japan . |
| 61-104107 | 5/1986 | Japan . |
| 61-237805 | 10/1986 | Japan . |
| 311129 | 1/1956 | Switzerland . |
| 2012927 | 8/1979 | United Kingdom . |
| 2082084 | 3/1982 | United Kingdom . |
| 2082085 | 3/1982 | United Kingdom . |

OTHER PUBLICATIONS

Brennstoff Wärme Kraft, Dokumentation Rauchgasreinigung, vol. 37, No. 9, Sep. 1985, pp. 8-19, VDI-Verlag GmbH, Dusseldorf, DE; H. Juntgen et al.: "Rauchgasreinigung in Grossfeuerungsanlagen".

Primary Examiner—Douglas Hart
Attorney, Agent, or Firm—Wenderoth, Lind & Ponack

[57] ABSTRACT

An exhaust heat exchanger system recovers heat from exhaust gas emitted from a prime mover, for example, a diesel engine, gas engine, gas turbine, etc., and/or to reduce harmful components such as $NO_X$ (nitrogen oxides). A high-temperature side heat exchanger section and a low-temperature side heat exchanger section are disposed in a single casing and these heat exchanger sections are connected together through a duct. An exhaust gas purifying catalyst is disposed in the duct. Accordingly, it is possible to simplify the mechanism of the exhaust heat exchanger system, reduce the overall size of the system, lower the production cost and minimize the installation space. Further, the exhaust gas purifying operation is efficiently carried out by the action of the catalyst.

6 Claims, 3 Drawing Sheets

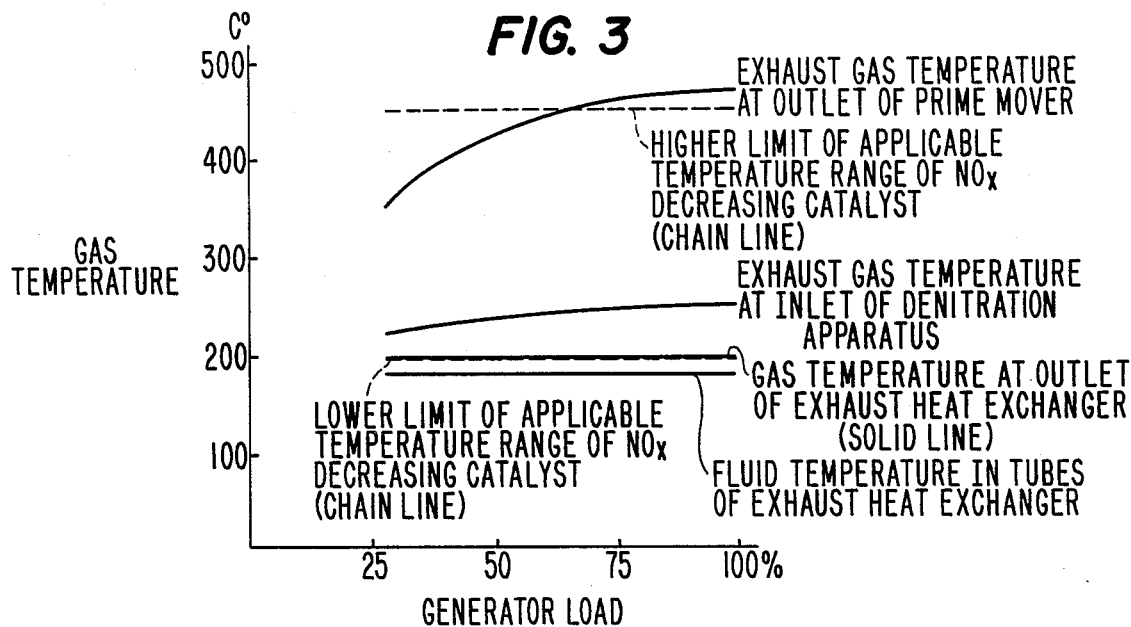
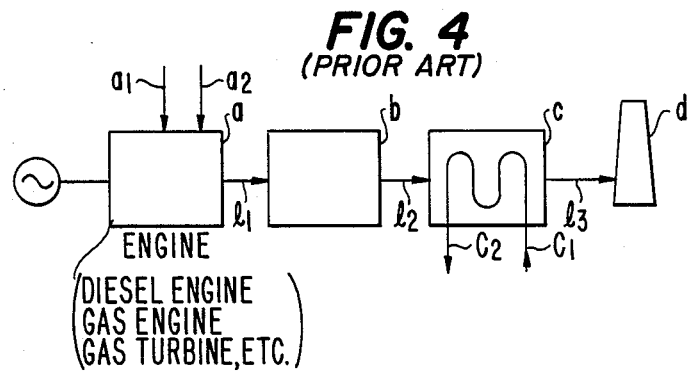
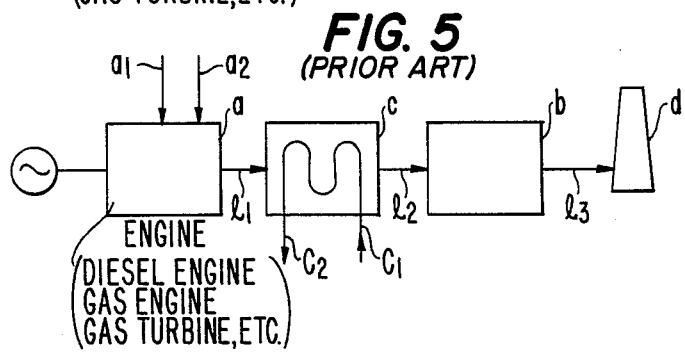
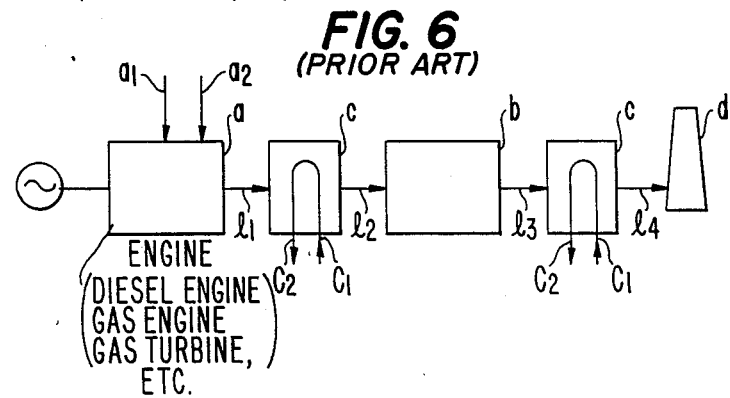

EXHAUST HEAT EXCHANGER SYSTEM

BACKGROUND OF THE INVENTION

1. Field of the Invention

The present invention relates to an exhaust heat exchanger system designed to recover heat from exhaust gas emitted from a prime mover, for example, a diesel engine, gas engine, gas turbine, etc., and/or to reduce harmful components such as $NO_X$ (nitrogen oxides) in the exhaust gas.

2. Description of the Related Art

Prior art arrangements concerning cogeneration denitration systems for use in prime movers for generators may be roughly divided into three types which are shown in FIGS. 4, 5 and 6, respectively. The cogeneration system shown in FIG. 4 is applied to uses where the temperature of exhaust gas emitted from a prime mover a (in the case of a diesel engine) is about 450° or less. In this system, a denitration apparatus b is connected to an exhaust pipe line $l_1$ of prime mover a for driving a generator. The denitration apparatus b is injected with ammonia ($NH_3$) to reduce and thereby minimize $NO_X$ (nitrogen oxides) in exhaust gas in the presence of a catalyst. The high-temperature exhaust gas which has been treated in the denitration apparatus b is supplied through an exhaust pipe line $l_2$ to an exhaust heat exchanger c where heat is recovered from the exhaust gas, and the treated gas is then released into the atmosphere through an outlet piping $l_3$ and a stack d.

The cogeneration system shown in FIG. 5 is applied to uses where the temperature of exhaust gas from a prime mover a is about 500° C. as in the case of a small-sized, high-speed diesel engine. In contrast to the system shown in FIG. 4, this system is arranged such that an exhaust heat exchanger c is connected to the exhaust pipe line $l_1$ of the prime mover a, and a denitration apparatus b is connected to the exhaust pipe line $l_2$ of the exhaust heat exchanger c, whereby exhaust gas emitted from the prime mover a is first supplied to the exhaust heat exchanger c where the gas is cooled by heat exchange and the resulting low-temperature exhaust gas is then supplied to the denitration apparatus b so that the exhaust gas is maintained at a temperature below the higher limit of the range of exhaust gas temperatures applicable to the catalyst incorporated in the denitration apparatus b.

In contrast to the system shown in FIG. 5, the cogeneration system shown in FIG. 6 is arranged such that a second exhaust heat exchanger c is additionally connected to the exhaust pipe line $l_3$ of a denitration apparatus b, whereby the exhaust gas after the heat recover carried out in a first exhaust heat exchanger c which is disposed at the upstream side of the denitration apparatus b is further subjected to heat recovery in the downstream-side exhaust heat exchanger c, thereby further lowering the exhaust gas temperature.

Each of the above-described denitration apparatuses b is arranged such that $NO_X$ in the exhaust gas is reduced by ammonia injected in the presence of a catalyst. The operating temperature of the catalyst is given as a function of the $SO_3$ concentration with a view to preventing deterioration of the catalyst performance and therefore restricted within a predetermined temperature range. The catalyst performs the following reducing reactions to decrease $NO_X$ (nitrogen oxides):

$$4NO + 4NH_3 + O_2 \rightarrow 4N + 6H_2O$$

$$2NO_2 + 9NH_3 + 4O_2 \rightarrow 5N_2 + 12H_2O$$

Each of the above-described exhaust heat exchangers c is arranged in the form of a heat recovery mechanism wherein exhaust gas is cooled by heat exchange with feed water (coolant), while the feed water is heated by such heat exchange and applied to various uses in the form of hot water or steam. In FIGS. 4-6, the reference symbol $a_1$ denotes an air supply pipe, $a_2$ a fuel supply pipe, $c_1$ a feed water (coolant) inlet pipe, and $c_2$ a feed water (coolant) outlet pipe.

The above-described conventional cogeneration denitration systems suffer, however, from the following problems.

The cogeneration system shown in FIG. 4 is not applicable to the case where the temperature of exhaust gas emitted from a prime mover exceeds about 450° C., that is, the higher limit of the applicable temperature range of the catalyst incorporated in the denitration apparatus. In the cogeneration system shown in FIG. 5, lowering of the exhaust gas temperature in the exhaust heat exchanger is restricted by the lower limit of the applicable temperature range of the catalyst in the denitration apparatus, so that it is impossible to satisfactorily lower the exhaust gas temperature in the exhaust heat exchanger and it is therefore necessary to by-pass the exhaust gas, resulting in low heat recovery efficiently. Other exhaust gas purifying catalysts, for example, a desulfurizing catalyst and the like, also have respective applicable temperature ranges and therefore suffer from the same problems as in the the case of the above-described denitration catalyst.

In the cogeneration system shown in FIG. 6, two exhaust heat exchangers are provided at the upstream and downstream sides, respectively, of the denitration apparatus, and therefore the system suffers from the following problems: the mechanism is complicated by a large margin; the overall size of the system is increased; the production cost is high; and it is difficult to provide sufficient installation space therefor.

SUMMARY OF THE INVENTION

In view of the above-described problems of the prior art systems, it is a primary object of the present invention to provide an exhaust heat exchanger system having a compact structure.

To this end, the present invention provides an exhaust heat exchanger system which comprises: a high-temperature side heat exchanger section and a low-temperature side heat exchanger section, in which exhaust gas emitted from a prime mover or the like is subjected to heat exchange with a coolant, these two heat exchanger sections being provided in a single casing; and a duct attached to the casing for connection together an exhaust gas outlet of the high-temperature side heat exchanger section and an exhaust gas inlet of the low-temperature side heat exchanger section.

An exhaust gas purifying catalyst, for example, an $NO_X$ decreasing catalyst forming a denitration apparatus, may be disposed in the above-described duct to form an exhaust heat exchanger system incorporating a denitration apparatus.

Exhaust gas emitted from a prime mover or the like is first coolant in the high-temperature side heat exchanger section by heat exchange with a coolant and then supplied through the duct to the low-temperature side heat exchanger section where the exhaust gas is further cooled by heat exchange before being discharged outside from the heat exchanger. The two, i.e., high- and low-temperature side, heat exchanger sections are provided in a single casing, and the exhaust gas outlet of the former and the exhaust gas inlet of the latter are connected through a duct. Therefore, it is possible to provide a compact exhaust heat exchanger system.

The exhaust gas is first cooled in the high-temperature side heat exchanger section and purified by the action of a catalyst disposed in the duct and further cooled in the low-temperature side heat exchanger section. Thus, the temperature of the exhaust gas supplied to the catalyst is maintained within the applicable temperature range of the catalyst, so that the exhaust gas is efficiently purified by the action of the catalyst, while exhaust heat absorption, that is, heat recovery, is efficiently carried out by the exhaust heat exchanger system. In addition, since the exhaust gas purifying catalyst is disposed within the duct, the mechanism is simplified and reduced in size by a large margin.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements and, in which:

FIG. 3 is a graph showing operating characteristics of the embodiment of the present invention;

FIG. 4 is a schematic view of a cogeneration system according to one prior art arrangement;

FIG. 5 is a schematic view of a cogeneration system according to another prior art arrangement; and FIG. 6 is a schematic view of a cogeneration system according to still another prior art arrangement.

DESCRIPTION OF THE PREFERRED EMBODIMENT

The present invention will be described hereinunder in more detail with reference to FIGS. 1 to 3.

Figure 1:
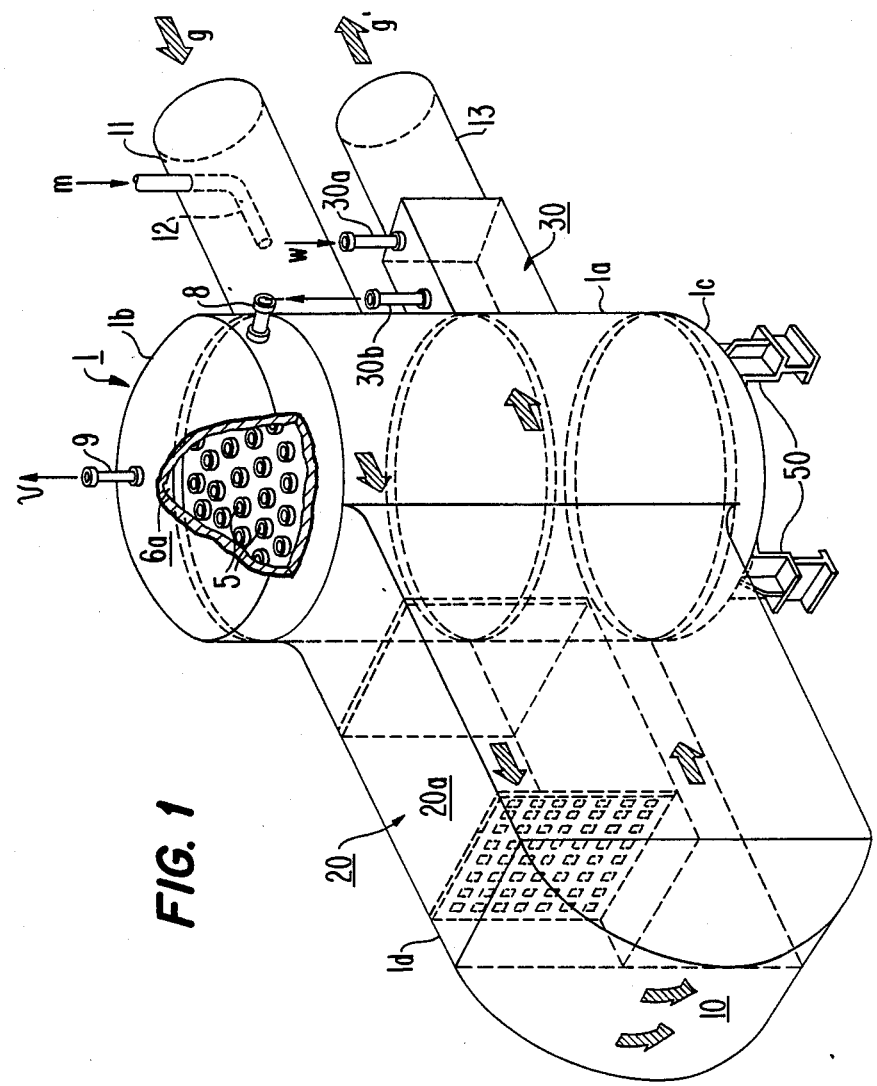
FIG. 1 is a perspective view showing the mechanism of one embodiment of the present invention.
Figure 2:
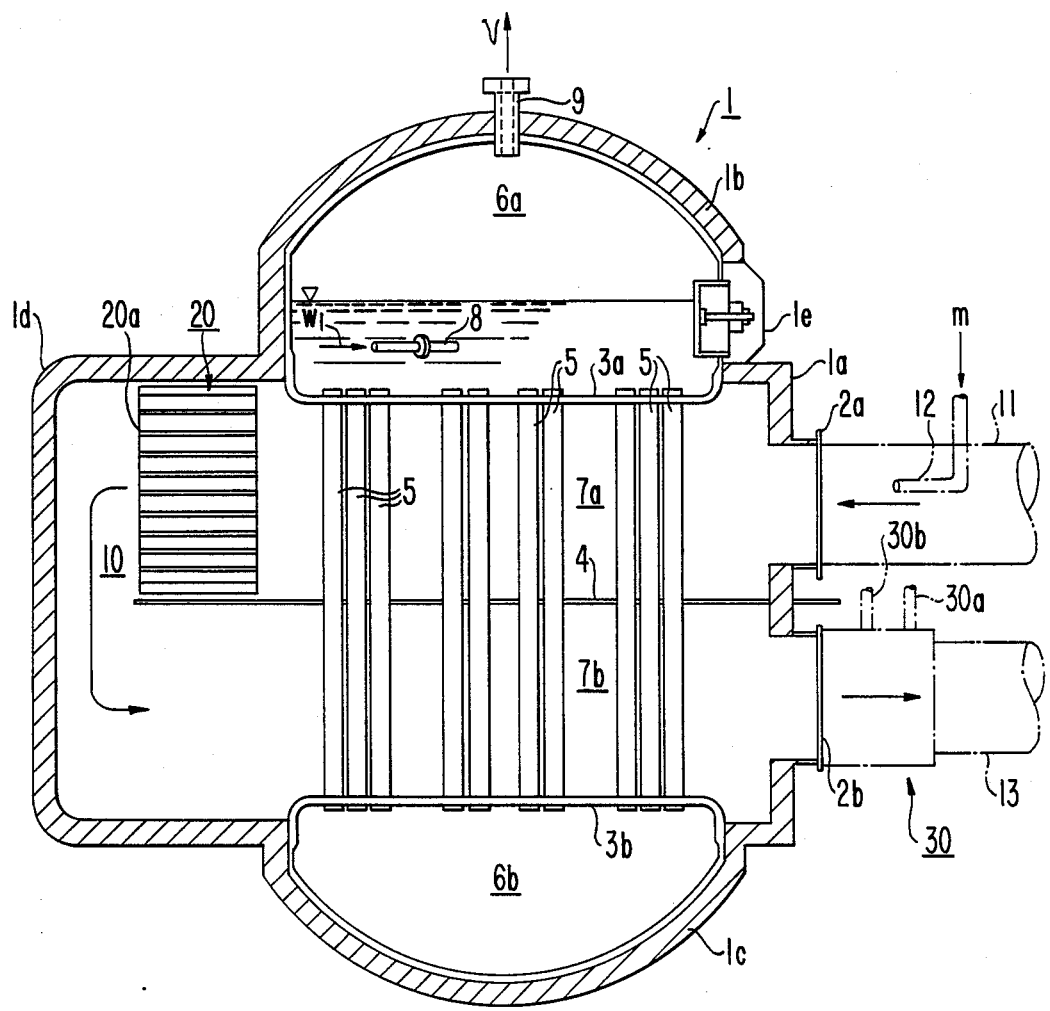
FIG. 2 is a vertical sectional view of the mechanism shown in FIG. 1.

Referring first to FIGS. 1 and 2, which show in combination one embodiment of the present invention, the reference numeral 1 denotes an exhaust heat exchanger, 20 a denitration apparatus, and 30 a low-temperature feed water gas heater. The exhaust heat exchanger 1 is designed to achieve heat-exchange between exhaust gas emitted from a prime mover (not shown) and a coolant (water). The exhaust heat exchanger 1 has a casing comprising a cylindrical body 1a having an upper end plate 1b and a lower end plate 1c and a bend casing portion 1d provided on one side of the cylindrical body 1a. A curved or bent intermediate duct portion 10 is provided within the casing 1a–1d of the exhaust heat exchanger 1, and an $NO_X$ decreasing catalyst 20a which constitutes the denitration apparatus 20 is disposed in the intermediate duct portion 10, thus forming an exhaust heat exchanger system having the denitration apparatus 20 incorporated in the exhaust heat exchanger 1.

The exhaust heat exchanger 1 will be described hereinunder in more detail. An opening with a connecting flange 2a and another opening with a connecting flange 2b are provided in the cylindrical body 1 of the casing 1a–1d at upper and lower positions, respectively, on one side thereof. To the opening with the connecting flange 2a is connected an inlet gas duct 11 which introduces exhaust gas g emitted from the prime mover (a diesel engine, gas engine, gas turbine, etc., shown in FIG. 4 by a) and which incorporates an ammonia injection nozzle 12. To the opening with the connecting flange 2b is connected an outlet gas duct 13 through the low-temperature feed water gas heater 30. In the cylindrical body 1a provided with the upper and lower end plates 1b and 1c are disposed an upper tube plate 3a, a lower tube plate 3b and a partition plate 4 disposed halfway between the upper and lower tube plates 3a and 3b. Fin tubes 5 are provided between the upper and lower tube plates 3a and 3b. Thus, a steam chamber 6a is defined between the upper end plate 1b and the upper tube plate 3a, a water chamber 6b is defined between the lower end plate 1c and the lower tube plate 3b, and heat exchanger sections 7a and 7b are defined between the upper tube plate 3a and the partition plate 4 and between the lower tube plate 3b and the partition plate 4, respectively. The intermediate duct portion 10 defined inside the bend casing portion 1d provided on the other side of the cylindrical body 1a is partly divided by the partition plate 4 so as to from a U-shaped duct which is connected to the heat exchanger sections 7a and 7b partitioned from each other by the partition plate 4.

Thus, heat exchanger sections 7a, 7b are arranged side-by-side and in series and extend parallel to each other. The upper end plate 1b is provided with a feed water pipe 8 and an outlet steam pipe 9. The upper and lower end plates 1b and 1c are provided with respective lidded manholes 1e. The heat exchanger section 7a is communicated with the inlet gas duct 11 to define a high-temperature side heat exchanger section, while the heat exchanger section 7b is supplied with exhaust gas from the heat exchanger section 7a through the intermediate duct portion 10 to define a low-temperature side heat exchanger section.

The denitration apparatus 20 will next be explained in detail. The $NO_X$ decreasing catalyst 20a is disposed in the straight portion of the intermediate duct portion 10 provided in the bend casing portion 1d to from the denitration apparatus 20. The $NO_X$ decreasing catalyst 20a is arranged in the form of a cassette so that it can be readily loaded and unloaded through a lidded opening (not shown) provided in the bend casing portion 1d. Although in the illustrated embodiment the $NO_X$ decreasing catalyst 20a is disposed in the upper horizontal portion of the intermediate duct portion 10, it may also be disposed in the lower horizonal portion or in each of the upper and lower horizontal portions.

The low-temperature feed water gas heater 30 will next be explained in detail. The heater 30 has a low-temperature feed water inlet pipe 30a and outlet pipe 30b and is arranged such that hot water obtained in the low-temperature feed water gas heater 30 is fed into high-temperature hot water stored in the steam chamber 6a from the outlet pipe 30b through the feed water pipe 8. The heat exchanger tube of the low-temperature feed water gas heater 30 which is directly connected to the inlet pipe 30a and the outlet pipe 30b may be disposed in the shape of a U or W within the outlet gas duct 13.

Although in the illustrated embodiment the cylindrical body 1a is installed on a base 50 so as to extend vertically, it may be disposed horizontally. It is also possible to provide a plurality of openings having respective connecting flanges 2a and a plurality of openings having respective connecting flanges 2b in such a manner that these openings are circumferentially spaced apart from each other. Accordingly, it is also possible to correspondingly increase the number of ammonia injection nozzles 12, inlet gas ducts 11, low-temperature feed water gas heaters 30 and outlet gas ducts 13.

The following is a detailed description of the operation of the embodiment of the present invention having the foregoing arrangement.

High-temperature exhaust gas g emitted from a prime mover (e.g., a diesel engine, gas engine, gas turbine, etc.) is introduced into the high-temperature side heat exchanger section 7a of the exhaust heat exchanger 1, together with ammonia m which is injected from the ammonia injection nozzle 12 at the end portion of the inlet duct 11. In the heat exchanger section 7a, the mixture of exhaust gas g and ammonia m passes through the space defined between the fin tubes 5 while exchanging heat with the coolant (water) in the tubes 5. As a result, the exhaust gas is cooled down to a temperature below the upper limit of the applicable temperature range of the $NO_X$ decreasing catalyst 20a constituting the denitration apparatus 20 and also the flow is straightened by the tubes 5. The cooled and straightened exhaust gas then passes through the catalyst 20a disposed in the intermediate duct portion 10, whereby $NO_X$ in the exhaust gas is efficiently reduced and thereby decreased (see the foregoing description of $NO_X$ reducing reactions).

Exhaust gas having $NO_X$ minimized in the denitration apparatus 20 is then introduced into the low-temperature side heat exchanger section 7b through the intermediate duct portion 10. In the heat exchanger section 7b, the exhaust gas passes through the space defined between the fin tubes 5 while exchanging heat with the coolant (water) in the tubes 5. As a result, the exhaust gas is further cooled and then introduced into the low-temperature feed water gas heater 30 where the residual heat in the exhaust gas is absorbed by low-temperature feed water w through heat exchange taking place between the two, i.e., the low-temperature feed water w and the exhaust gas. Thus, the low-temperature feed water w is raised in temperature to become hot water which is then supplied through the feed water inlet 8 into high-temperature hot water ($w_1$, i.e., coolant) in the steam chamber 6a. The exhaust gas g' which has been sufficiently cooled down by being derived of heat through heat exchange in the low-temperature feed water gas heater 30 passes through the outlet gas duct 13 and is then released into the atmosphere from the stack (d in FIG. 4).

A desired amount of high-temperature hot water ($w_1$, i.e., coolant) is ensured in the exhaust heat exchanger 1 by feeding of hot water from the low-temperature fed water gas heater 30. The hot water $w_1$ lowers from the steam chamber 6a through the tubes 5 while exchanging heat with exhaust gas g in the upper and lower heat exchanger sections 7a and 7b. Absorbing heat from the exhaust gas g, the hot water $w_1$ becomes high-temperature hot water and rises. Steam alone is taken out from the steam outlet pipe 9 provided at the top of the steam chamber 6a and applied to various uses.

The exhaust gas g is injected with ammonia m when introduced into the exhaust heat exchanger 1 and is then properly cooled down through heat exchange and also the flow is straightened by the tubes 5 in the heat exchanger section 7a before being introduced to the $NO_X$ decreasing catalyst 20a. Accordingly, the temperature of the exhaust gas g supplied to the catalyst 20a is maintained within the applicable temperature range of the catalyst 20a. In addition, the straightening of the flow of the exhaust gas enables considerable improvements in $NO_X$ reducing efficiency and operating reliability. In the exhaust heat exchanger 1, the exhaust gas g is first heat-exchanged in the high-temperature side heat exchanger section 7a and further heat-exchanged in the low-temperature side heat exchanger section 7b. The degree of lowering of the temperature of the exhaust gas g in the heat exchanger section 7a is determined in accordance with the catalyst 20a, while the degree of lowering of the temperature of the exhaust gas g in the heat exchanger section 7b can be set as desired irrespective of the catalyst 20a. Accordingly, it is possible to enhance the exhaust heat recovery efficiently by a large margin and also it is possible to control the temperatures of exhaust gas and coolant in each portion of the heat exchanger by, for example, adjusting the cross-sectional areas of the heat exchanger sections 7a and 7b. Thus, characteristics such as those shown in FIG. 3 are obtained.

Further, the residual heat in the exhaust gas is absorbed by means of the low-temperature feed water gas heater 30 and the heat thus absorbed is employed to generate steam, thus enabling a further enhancement of the heat recovery efficiency. The purpose of the present invention can be attained even if the low-temperature feed water gas heater 30 is employed in place of the heat exchanger section 7b.

The heat exchanger sections 7a and 7b in this embodiment are accommodated in a single casing and these sections are connected together through the intermediate duct portion 10, so that the entire system can be made compact.

Since the denitration apparatus 20 is incorporated in the casing of the heat exchanger 1, the mechanism is simplified and reduced in size by a large margin, as illustrated.

As has been described above, according to the present invention, a high-temperature side heat exchanger section and a low-temperature side heat exchanger section are disposed in a single casing and these heat exchanger sections are connected together through a duct, and further, an exhaust gas purifying catalyst is disposed in the duct. Accordingly, it is possible to simplify the mechanism of the exhaust heat exchanger system, reduce the overall size of the system, lower the production cost and minimize the installation space. Further, the exhaust gas purifying operation is efficiently carried out by the action of the catalyst and therefore the operating reliability is enhanced. In addition, the exhaust heat recovery efficiency is markedly improved.

Although the present invention has been described in specific terms, it should be noted here that the described embodiment is not necessarily exclusive and various changes and modifications may be imparted thereto without departing from the scope and spirit of the present invention which is limited solely by the appended claims.

What is claimed is:

1. A system for recovering heat from and removing harmful components from an exhaust gas from a prime mover combustion engine, said system comprising:

a single casing containing therein a high-temperature side heat exchanger section and a low-temperature side heat exchanger section, said high-temperature side heat exchanger section having an exhaust gas inlet to receive exhaust gas from said prime mover combustion engine and an exhaust gas outlet, and said low-temperature side heat exchanger section having an exhaust gas inlet and an exhaust gas outlet;

a bent duct connecting said exhaust gas outlet of said high-temperature side heat exchanger section with said exhaust gas inlet of said low-temperature side heat exchanger; and an exhaust gas purifying catalyst located within said bent duct;

whereby exhaust gas received in said high-temperature side heat exchanger section is cooled therein, then is passed through said catalyst in said bent duct and has harmful components removed therefrom, and then is passed through said low-temperature side heat exchanger section and is further cooled therein.

2. A system as claimed in claim 1, wherein said high-temperature side and low-temperature side heat exchanger sections extend parallel to each other.

3. A system as claimed in claim 2, wherein said high-temperature side and low-temperature side heat exchanger sections are located side-by-side and are separated by a partition.

4. A system as claimed in claim 1, wherein said bent duct is located at a first side of said casing, and said exhaust gas inlet of said high-temperature side heat exchanger section and said exhaust gas outlet of said low-temperature side heat exchanger section are located at a second side of said casing opposite said first side thereof.

5. A system as claimed in claim 1, wherein said exhaust gas purifying catalyst comprises a denitration apparatus for removing nitrogen oxides from the exhaust gas.

6. A system as claimed in claim 1, further comprising low-temperature feed water gas heater means, located to receive the further cooled exhaust gas from said exhaust gas outlet of said low-temperature side heat exchanger section, for removing residual heat from the exhaust gas and for raising the temperature of a feed water.

* * * * *